United States Patent [19]
Christeson et al.

[11] Patent Number: 5,579,522
[45] Date of Patent: Nov. 26, 1996

[54] DYNAMIC NON-VOLATILE MEMORY UPDATE IN A COMPUTER SYSTEM

[75] Inventors: Orville H. Christeson, Portland; Douglas L. Gabel, Aloha; Sean T. Murphy, Portland, all of Oreg.

[73] Assignee: Intel Corporation, Santa Clara, Calif.

[21] Appl. No.: 505,995

[22] Filed: Jul. 24, 1995

Related U.S. Application Data

[63] Continuation of Ser. No. 135,310, Oct. 12, 1993, which is a continuation of Ser. No. 695,952, May 6, 1991, abandoned.

[51] Int. Cl.⁶ ............................................. G06F 9/06
[52] U.S. Cl. .................. 395/652; 364/280.2; 364/280.9; 364/DIG. 1
[58] Field of Search ........................ 395/700; 364/280.2, 364/280.9

[56] References Cited

U.S. PATENT DOCUMENTS

| | | | |
|---|---|---|---|
| 4,153,937 | 5/1979 | Poland | 364/706 |
| 4,290,104 | 9/1981 | Holtey et al. | 395/400 |
| 4,374,417 | 2/1983 | Bradley et al. | 395/400 |
| 4,441,155 | 4/1984 | Fletcher et al. | 395/400 |
| 4,443,847 | 4/1984 | Bradley et al. | 395/425 |
| 4,608,632 | 8/1986 | Kummer | 395/425 |
| 4,763,333 | 8/1988 | Byrd | 371/66 |
| 4,799,145 | 1/1989 | Goss et al. | 395/700 |
| 4,831,522 | 5/1989 | Henderson et al. | 395/425 |
| 4,862,349 | 8/1989 | Foreman et al. | 395/700 |
| 5,034,915 | 7/1991 | Styrna et al. | 395/775 |
| 5,053,990 | 10/1991 | Kreifels | 364/900 |
| 5,117,492 | 5/1992 | Nash | 395/400 |

(List continued on next page.)

OTHER PUBLICATIONS

Waite et al., "CP/M Bible", 1983, pp. 5–22 and 100.
Glass, Brett, "The IBM PC BIOS", Byte, Apr. 1989, pp. 303–310.
Venditto, Gus, "Pipeline", PC Magazine V.9, N.3, Feb. 1990, pp. 1–3.
Machrone, Bill, "Bill Machrane", PC Magazine V.9, N.7, Apr. 1990, pp. 1–2.
Venditto, Gus, "Intel's flash memory poised to give laptops their next great leap", PC Magazine V. 9, N. 14, Aug. 1990, pp. 1–3.

(List continued on next page.)

*Primary Examiner*—Kevin A. Kriess
*Assistant Examiner*—Dennis M. Butler
*Attorney, Agent, or Firm*—Blakely, Sokoloff, Taylor & Zafman

[57] ABSTRACT

A computer system wherein a portion of code/data stored in a non-volatile memory device can be dynamically modified or updated without removing any covers or parts from the computer system. The computer system of the preferred embodiment includes a flash memory component coupled to a computer system bus for storing non-volatile code and data. Using the present invention, the contents of a portion of the flash memory may be replaced, modified, updated, or reprogrammed without the need for removing and/or replacing any computer system hardware components. The flash memory device used in the preferred embodiment contains four separately erasable/programmable non-symmetrical blocks of memory. One of these four blocks may be electronically locked to prevent erasure or modification of its contents once it is installed. This configuration allows the processing logic of the computer system to update or modify any selected block of memory without affecting the contents of other blocks. One memory block contains a normal BIOS. An electronically protected flash memory area is used for storage of a recovery BIOS which is used for recovery operations. The present invention also includes hardware for selecting one of the two available update modes: normal or recovery. Thus, using a mode selection apparatus, either a normal system BIOS or a recovery BIOS may be activated.

25 Claims, 6 Drawing Sheets

U.S. PATENT DOCUMENTS

| | | | |
|---|---|---|---|
| 5,126,808 | 6/1992 | Montalvo et al. | 357/23.5 |
| 5,134,580 | 7/1992 | Bertram et al. | 395/650 |
| 5,136,713 | 8/1992 | Bealkowski et al. | 395/700 |
| 5,142,680 | 8/1992 | Ottman et al. | 395/700 |
| 5,210,875 | 5/1993 | Bealkowski et al. | 395/700 |
| 5,257,380 | 10/1993 | Lang | 395/700 |
| 5,371,876 | 12/1994 | Ewertz et al. | 395/425 |
| 5,388,267 | 2/1995 | Chan et al. | 395/700 |

OTHER PUBLICATIONS

Wharton, John H., "FLASH! memory technology marches on", Microprocessor Report, Aug. 1990, pp. 1–4.

Levy, Markus A., "Designing with Flash Memory", Circuit Cellar Ink Dec. 1990, pp. 50–58.

Jex, Jerry, "Flash Memory BIOS For PC and Notebook Computers", IEEE, 1990, pp. 692–695.

Waite et al., "Soul of CP/M", Howard W. Sams and Co., 1983, pp. 2, 7–10, 177–182 and 279–322.

Weber, S., *Look Out EPROM's, Here Comes Flash*, T.O.C. and 44, 46, 50; ELECTRONICS Magazine (Nov., 1990).

Shandle, J., *Laptop Vendors Join the Flash Bandwagon*, T.O.C. and 52–53; ELECTRONICS Magazine (Nov., 1990).

Normal BIOS Map

DYNAMIC NON-VOLATILE MEMORY UPDATE IN A COMPUTER SYSTEM

This is a continuation of application Ser. No. 08/135,310, filed Oct. 12, 1993, which is a continuation of application Ser. No. 07/695,952, filed May 6, 1991, now abandoned.

FIELD OF THE INVENTION

The present invention relates to the field of computer systems. Specifically, the present invention relates to the field of computer system architectures incorporating a non-volatile form of basic operating system processing logic.

BACKGROUND OF THE INVENTION

Many prior art computer systems are typically configured at a minimum with a processor, a random access memory device, and a read only memory device. Some systems, such as a variety of calculators, may operate with only a processor and a read only memory device. Read only memory devices (ROM) provide a non-volatile form of memory that is not destroyed when power is removed from the computer system.

Prior art computer systems are typically bootstrapped (i.e. power up initialized) using the processing logic (i.e. firmware) stored within the read only memory device internal to the computer system. Since the read only memory device is non-volatile, the firmware within ROM is guaranteed to contain valid data or instructions; thus, the prior art computer system can be reliably bootstrapped using firmware within ROM. Many computer systems have successfully used this technique. One such system is the IBM Personal Computer (PC) developed by the IBM Corporation of Armonk, New York. Prior art versions of the IBM PC use read only memory devices for storage of firmware or a basic input/output system (BIOS) software program. The BIOS is operating system processing logic that provides the lowest level of software control over the hardware and resources of the computer system. ROM storage may also be used for non-volatile retention of network configuration data or application specific data. ROM devices in the prior art include basic read only memory devices (ROM), programmable read only memory devices (PROM), and eraseable programmable read only memory devices (EPROM).

Although ROM based computer systems have been very successful in the prior art, a number of problems exist with the use of these devices in a computer system. Read only memory devices must be programmed with a BIOS and/or data prior to being placed into the system during production and assembly of the computer system. Often the BIOS ROM is installed on a system circuit board within the computer housing. In order to replace, modify, or update firmware in a ROM based computer system, the computer housing must be removed and ROM devices on a system circuit board internal to the computer system must be disconnected and replaced or reprogrammed. This invasive ROM replacement and reprogramming procedure is disadvantageous for a number of reasons. First, the ROM replacement operation typically must be performed manually by qualified field service or computer repair personnel; thus, the operation tends to be expensive and time consuming. Secondly, even qualified technical service personnel may introduce problems during the ROM replace operation. If solder connections are necessary, existing connections may be damaged or weakened in the process. Also, electrostatic discharge may inadvertently cause damage to other components on the circuit board during the ROM replace operation. Thirdly, ROM based computer systems are not easily customized for specific applications. Such customization includes modifications for operation in non-English speaking countries. In order to customize a computer system by storing language-specific data in non-volatile memory, a user must program and install a read only memory device on a circuit board in the computer system. Because of the inconvenient ROM installation procedure in the prior art, a user is unable or less likely to customize his/her computer system.

Thus a better means for storing and updating non-volatile code and/or data in a computer system is needed.

SUMMARY OF THE INVENTION

The present invention is a computer system wherein a portion of code/data stored in a non-volatile memory device can be dynamically modified or updated without removing any covers or parts from the computer system. The computer system of the preferred embodiment comprises a bus for communicating information, a processor coupled with the bus for processing information, a random access memory device coupled with the bus for storing information and instructions for the processor, an input device such as an alpha numeric input device or a cursor control device coupled to the bus for communicating information and command selections to the processor, a display device coupled to the bus for displaying information to a computer user, and a data storage device such as a magnetic disk and disk drive coupled with the bus for storing information and instructions. In addition, the computer system of the preferred embodiment includes a flash memory component coupled to the bus for storing non-volatile code and data. Devices other than flash memory may be used for storing non-volatile code and data. Using the present invention, the contents of the flash memory may be replaced, modified, updated, or reprogrammed without the need for removing and/or replacing any computer system hardware components.

The flash memory device used in the preferred embodiment contains four separately erasable/programmable non-symmetrical blocks of memory. One of these four blocks may be electronically locked to prevent erasure or modification of its contents once it is installed. This configuration allows the processing logic of the computer system to update or modify any selected block of memory without affecting the contents of other blocks. One memory block contains a normal BIOS. The BIOS comprises processing logic instructions that are executed by the processor. An additional BIOS region can be used to extend the system BIOS memory area. An electronically protected (i.e. locked) flash memory area is used for storage of a recovery BIOS which is used for recovery operations. Each of these separately programmable regions of the flash memory may be modified or updated using the dynamic update mechanism of the present invention.

In order to prevent an aborted BIOS update from rendering the computer system non-functional, the update procedure of the present invention operates in two distinct user environments: a normal update mode and a recovery update mode. In normal update mode, the keyboard and video services of the computer system are available for receiving command selections and displaying results. The normal update mode also provides functionality to save, verify, or update areas of flash memory in addition to the BIOS areas. In recovery update mode, only the system BIOS areas can be updated. Recovery update mode is used when a user cannot boot the system because the normal system BIOS has been corrupted either following a power failure during a normal BIOS update or for some other reason.

A dynamic BIOS update program contains most of the processing logic of the present invention. The remaining portions of the processing logic of the present invention reside in the BIOS image itself. The dynamic update processing logic includes logic for handling a normal update mode and the recovery update mode.

The present invention also includes hardware means for selecting one of these two available update modes. In the preferred embodiment, this means of selecting an update mode is implemented as a jumper on a circuit board in the computer system.

Once the recovery mode is set using the jumper, the processor of the computer system may then be power-up initialized or reset. Upon power up or reset, the processor jumps to a location within the protected recovery BIOS block. In this manner, the flash device memory map may be reconfigured in a recovery mode by activating recovery mode processing logic residing in recovery BIOS block. Thus, using the mode selection means, either a normal system BIOS or a recovery BIOS may be activated.

When executing out of normal BIOS, the dynamic update program displays a menu of options for user selection. These options include: verification of a flash memory area, saving a selected flash memory area, updating a flash memory area, and exit. Using these command options, the flash memory areas that may be updated might include the normal system BIOS area, a user reserved area, a local area network (LAN) BIOS area, a SCSI BIOS area, a video data area, other hardware or software specific BIOS or data areas, or any other application specific processing logic in an area of flash memory.

It is therefore an object of the present invention to provide a means for storing non-volatile code and data in a computer system where non-volatile code and data may be updated without removing any parts from the computer system. It is a further object of the present invention to provide a means for updating a selected portion of non-volatile memory while leaving other portions unmodified. It is a further object of the present invention to provide a means for recovery in the event of a failure during the normal non-volatile memory update procedure. It is a further object of the present invention to provide a means for saving the current contents of non-volatile memory. It is a further object of the present invention to provide a means for verifying the content of code and/or data currently residing in non-volatile memory. It is a further object of the present invention to provide a means for embedding update control software within system BIOS such that the update control software may later be extracted and used for controlling the non-volatile memory update procedure.

These and other objects of the present invention will become apparent as presented and described in the following detailed description of the preferred embodiment.

DETAILED DESCRIPTION OF THE PREFERRED EMBODIMENT

The present invention is a computer system wherein a portion of the non-volatile memory may be modified or updated without removal of system hardware components. In the following description, numerous specific details are set forth in order to provide a thorough understanding of the present invention. However, it will be apparent to one of ordinary skill in the art that these specific details need not be used to practice the present invention. In other instances, well known structures, circuits and interfaces have not been shown in detail in order not to unnecessarily obscure the present invention.

Figure 1:
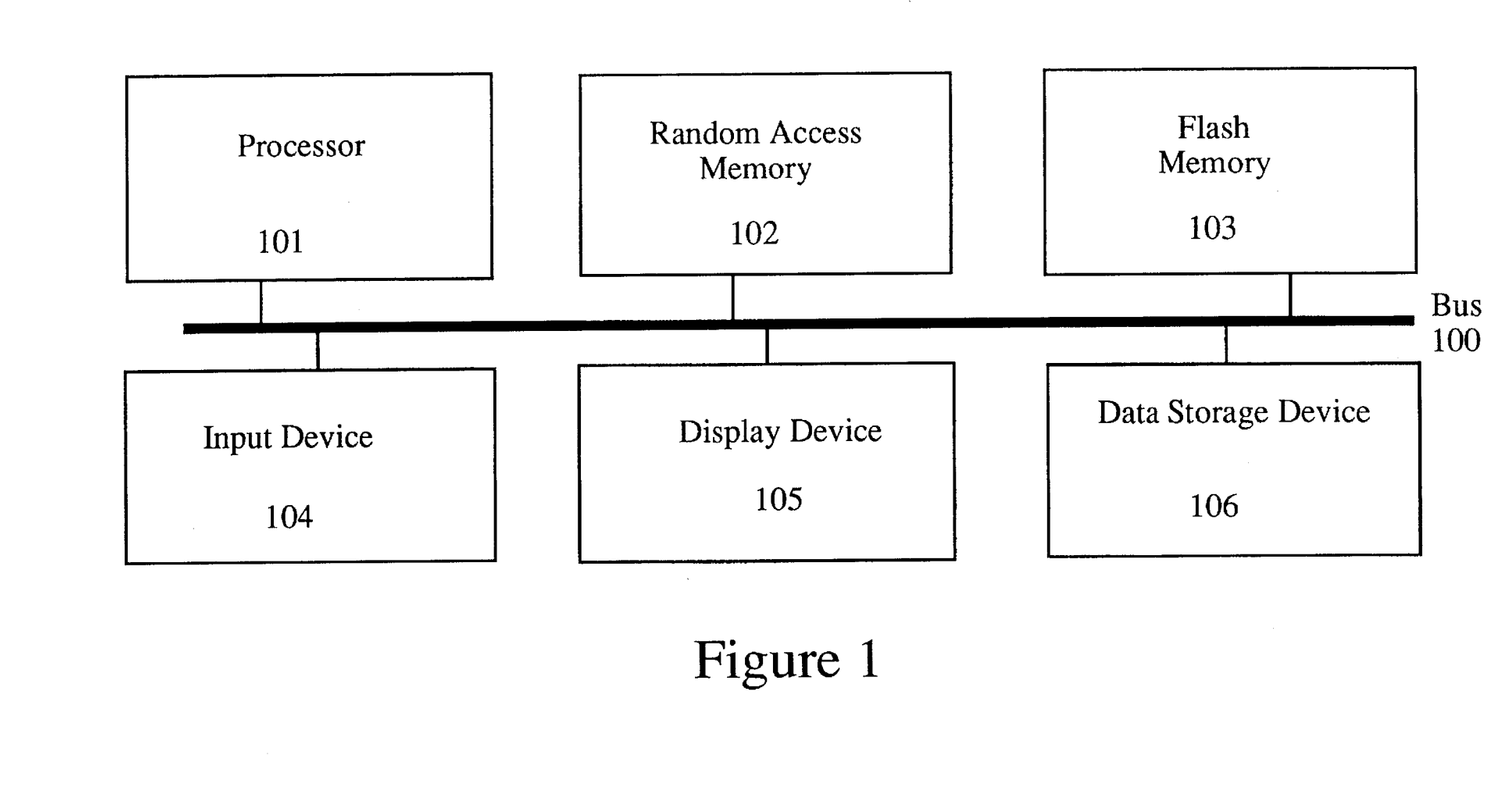
FIG. 1 is an illustration of a computer system of the present invention.

Referring to FIG. 1, a block diagram of the computer system of the present invention is illustrated. The preferred embodiment of the present invention is implemented using an 80386 microprocessor manufactured by the Assignee of the present invention. It will be apparent to those with ordinary skill in the art, however, that alternative processors and computer system architectures may be employed. In general, such computer systems as illustrated by FIG. 1 comprise a bus 100 for communicating information, a processor 101 coupled with the bus for processing information, a random access memory device 102 coupled with the bus 100 for storing information and instructions for the processor 101, an input device 104 such as an alpha numeric input device or a cursor control device coupled to the bus 100 for communicating information and command selections to the processor 101, a display device 105 coupled to the bus 100 for displaying information to a computer user, and a data storage device such as a magnetic disk and disk drive coupled with the bus 100 for storing information and instructions.

In addition, the computer system of the preferred embodiment includes flash memory component 103 coupled to the bus 100 for storing non-volatile code and data. Flash memory component 103 provides a non-volatile form of memory that is not destroyed when power is removed from the computer system; however, the contents of flash memory may be erased and reprogrammed. Flash memory devices are well known in the art. The basic input/output processing logic (BIOS) of the computer system is stored in flash memory 103. In addition, other system software and application specific parameters may also be stored in flash memory 103. For example, portions of flash memory may be used for storage of local area network (LAN) processing logic or Small Computer Standard Interface (SCSI) processing logic. The following sections describe how portions of the flash memory 103 may be replaced, modified, or reprogrammed (i.e. updated) without the need for removing and/or replacing any computer system hardware components.

Several types of non-volatile memory devices currently existing in the art may be reprogrammed without removing the device from a circuit board on which the device is installed. One class of reprogrammable non-volatile memory devices is flash memory. Several different types of flash memory devices exist in the art. Using a dedicated set of electrical signals, the contents of flash memory may be erased and reprogrammed with new data. Many prior art flash memory devices only allow complete erasure and reprogramming of all memory locations of the device. Other flash memory devices, however, are partitioned into separately erasable and programmable blocks of memory in a single flash memory device. In the preferred embodiment of the present invention, such a partitioned flash memory device is used. In the preferred embodiment, a flash memory device denoted 28F001BT is used. The 28F001BT flash memory device is a 1M bit memory device manufactured by the Assignee of the present invention. It will be apparent to those skilled in the art that other forms of reprogrammable non-volatile memory devices may be used with the invention taught herein. One example of such a non-flash device is an electrically erasable programmable read only memory (EEPROM).

Figure 2:
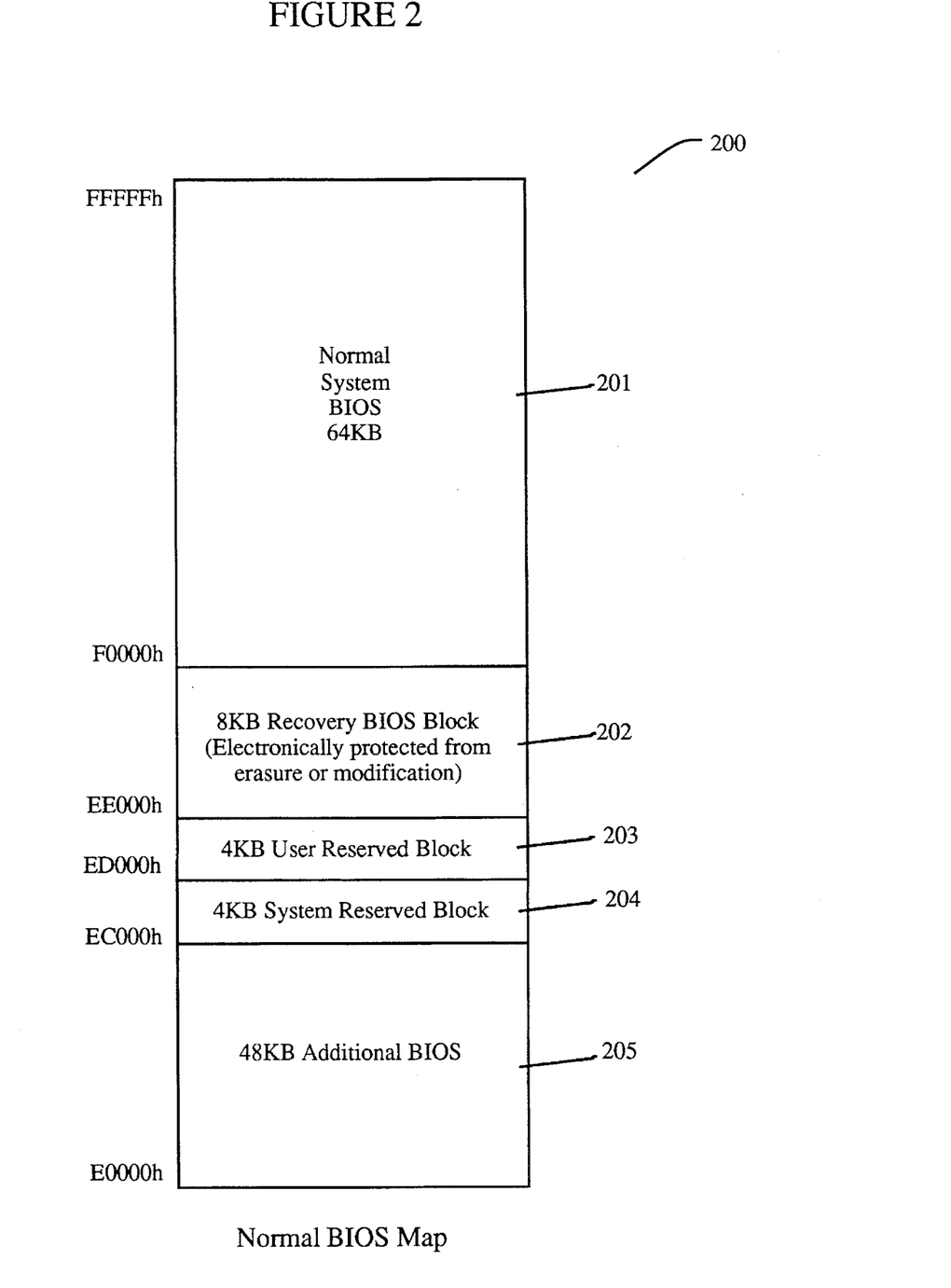
FIG. 2 is an illustration of a memory map of the BIOS in the flash memory device used in the preferred embodiment.

The flash memory device used in the preferred embodiment contains four separately erasable/programmable non-symmetrical blocks of memory. One of these four blocks may be electronically locked to prevent erasure or modification of its contents once it is installed. This configuration allows the processing logic of the computer system to update or modify any selected block of memory without affecting the contents of other blocks. Referring to FIG. 2, several separately erasable/programmable non-symmetric blocks of the flash memory device of the preferred embodiment are illustrated. FIG. 2 depicts a normal BIOS memory map 200 of the contents of flash memory. The BIOS comprises processing logic instructions that are executed by the processor. In the preferred embodiment of the present invention, the processor of the computer system is an 80386 microprocessor. When the computer system of the preferred embodiment is first powered up, the processor jumps to an initial location FFFF0H and starts execution. In order to handle the initialization of the computer system, the active system BIOS must therefore include the location FFFF0H. As indicated by the normal BIOS map 200 illustrated in FIG. 2, the processor jumps to a location within a normal system BIOS 201 on power up or reset of the processor. Processing logic within region 201 may be used to handle normal initialization and control functions of the computer system. Additional BIOS region 205 can be used to extend the system BIOS memory area.

Electronically protected (i.e. locked) flash memory area 202 is an area for storage of a recovery BIOS used for recovery operations. The recovery operation is described in the sections below. Separately programmable area 203 is a memory area reserved for use by a particular user or application. This area may be used to customize the operation of the computer system or to enhance the functionality of the system BIOS. As described below, separately programmable area 203 may contain LAN processing logic, SCSI processing logic, video data or control logic, other hardware or software specific logic or data, or any other application specific processing logic in an area of flash memory. If separately programmable area 203 contains LAN or SCSI logic, the system BIOS is enabled to scan these additional flash areas in order to boot load the computer system from a network or other external device. Separately programmable area 204 is an area reserved for system use. This area may be an additional overflow area for normal system BIOS. Each of these separately programmable regions of the flash memory may be modified or updated using the dynamic update mechanism of the present invention as described below.

One disadvantage of using a flash memory device for storage of a BIOS is the possibility of a power failure or other error during the update process. The resulting incomplete or corrupted BIOS would render the system non-functional. In order to restore operation of the computer system after an aborted BIOS update, parts of the computer system would have to be removed and reprogrammed. Removal of flash memory components may be further complicated if surface mount flash devices are used.

In order to prevent an aborted BIOS update from rendering the computer system non-functional, the update procedure of the present invention operates in two distinct user environments: a normal update mode and a recovery update mode. The major difference between these two environments is the user interface. In normal update mode, the keyboard and video services of the computer system are available for receiving command selections and displaying results. Using the robust normal update user interface, the user may specify a save, verify, or update flash memory operation. The user may also specify the data file to retrieve or save from various sources such as a floppy disk drive, hard disk drive, network, or modem. The data contained within a retrieved or saved file may be a BIOS image, data image, or other memory image representation of the contents of a non-volatile or flash memory area. The normal update mode also provides functionality to save, verify, or update other areas of flash memory in addition to the BIOS areas. In recovery update mode, only the system BIOS areas can be updated. Recovery update mode is used when a user cannot boot the system because the normal system BIOS has been corrupted either following a power failure during a normal BIOS update or for some other reason. In this situation, a separate set of processing logic residing in the protected recovery BIOS block 202 illustrated in FIG. 2 is executed strictly for the purpose of updating the corrupted normal system BIOS area 201. In order to reduce the memory area consumed by the recovery BIOS processing logic, only a minimal level of functionality is provided and no user interface capability is supported. The keyboard and video services are not available and predetermined actions must be performed by the recovery BIOS without user interaction. Audible beep codes issued from a speaker of the computer system indicate the status of the programming of the BIOS area.

In the normal operation of the computer system of the preferred embodiment, processor 101 initially executes instructions out of the normal system BIOS region 201 of flash memory 103. Subsequently, a full-featured operating system may be read from data storage device 106 into random access memory (RAM) 102 and executed from RAM 102. Code in system BIOS 201 may also be used for initialization and normal access to input device 104, display device 105, and data storage device 106. Once the full-featured operating system is transferred and running in random access memory 102, other application executable files and data files may be accessed in data storage device 106. One such executable file is the dynamic non-volatile memory update program that contains most of the dynamic update processing logic of the present invention. The remaining portions of the processing logic of the present invention reside in the memory image itself. Files containing memory images and a file containing a predefined recovery BIOS image used for recovery mode updates also resides on data storage device 106. A memory image, of which a BIOS image is a specific type, is the binary contents of the target update area in non-volatile or flash memory. The dynamic update processing logic may be activated and executed using means well known to those of ordinary skill in the art. The dynamic update processing logic thus activated includes logic for handling a normal update mode and the recovery update mode. The architecture and operation of the dynamic update processing logic is described below.

As indicated above, the preferred embodiment operates in two basic modes: a normal update mode and a recovery update mode. The present invention also includes hardware means for selecting one of these two available update modes. In the preferred embodiment, this means of selecting an update mode is implemented as a jumper on a circuit board in the computer system. The jumper is used to modify address line 16 in an interface to the flash memory device. By setting the jumper to a first setting, the normal BIOS map illustrated in FIG. 2 and the corresponding normal BIOS update utility may be used. When the jumper is set to a second setting, a recovery BIOS map is configured and the recovery update mode is enabled. Other means for selecting one of two modes in a computer system, such a switch or push button will be apparent to those skilled in the art.

Figure 3A:
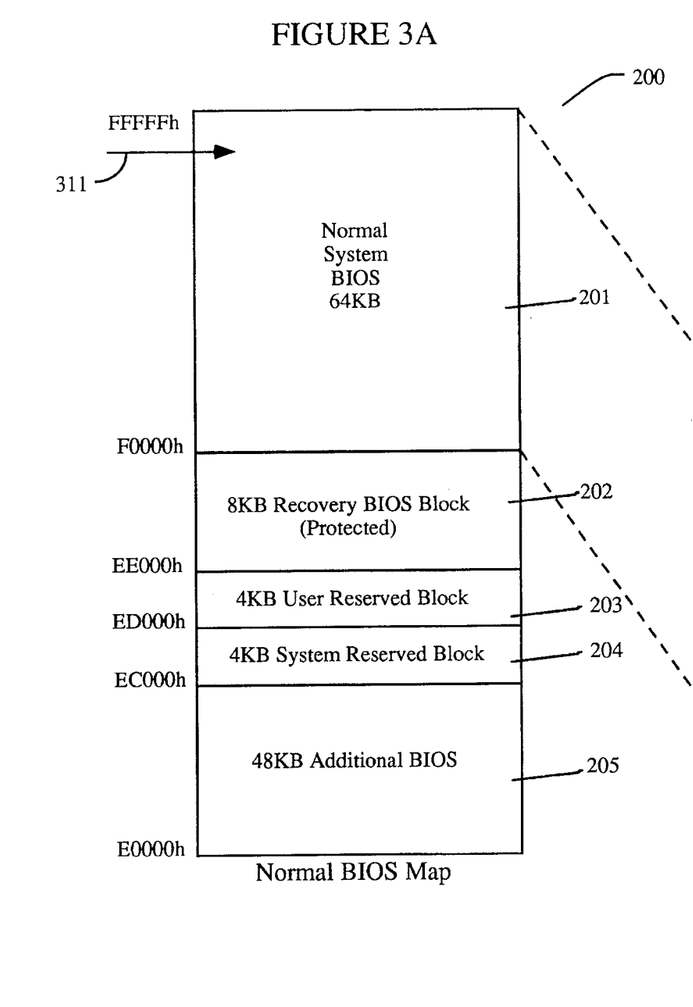
FIG. 3a is a memory map of the BIOS during normal operation.
Figure 3B:
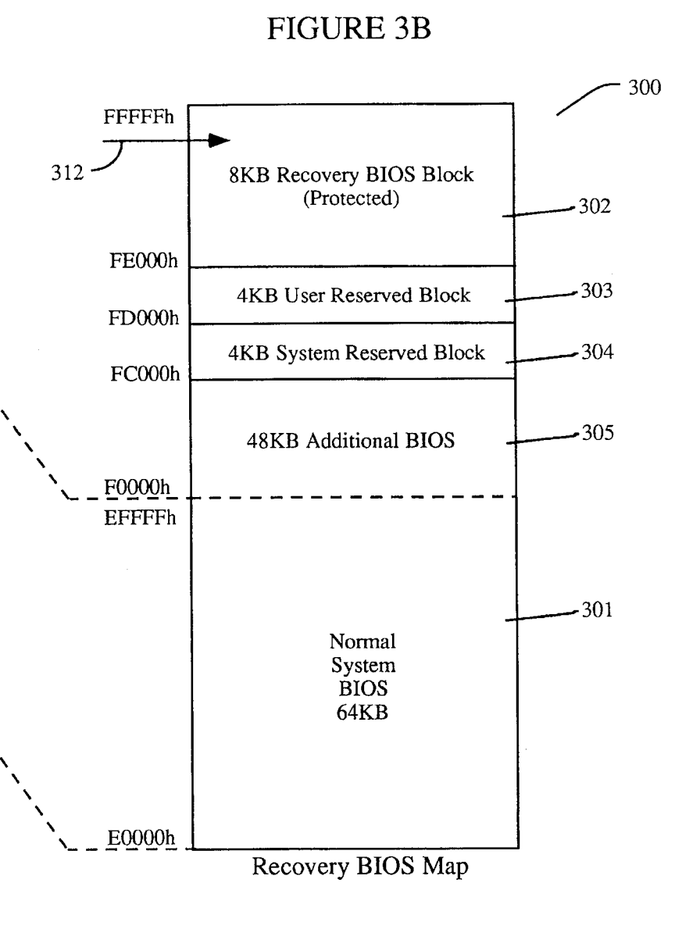
FIG. 3b is an illustration of the memory map of the BIOS during recovery mode.

Referring now to FIGS. 3a and 3b, the effect of the jumper in a recovery mode setting on the memory configuration in flash memory is illustrated. In FIG. 3a, a normal BIOS map 200 illustrates the configuration of flash memory while the jumper is set in a normal mode setting. This configuration is the same as that described above and illustrated in FIG. 2. On power up or after a system reset, the processor jumps to a location in normal system BIOS 201 indicted by arrow 311 in FIG. 3a. The processing logic in normal system BIOS 201 then takes control and initializes the computer system for normal operations. If, however, normal system BIOS 201 is corrupted such as following an aborted BIOS update operation, the execution within normal BIOS 201 will be unpredictable. Thus, without a recovery mode feature, the computer system with a corrupted normal system BIOS 201 will be non-functional.

If the initiation of the normal system BIOS 201 is unsuccessful because of a corrupted BIOS 201, the recovery mode may be selected by switching the selection means (i.e. jumper) to a recovery mode. In a recovery mode, address line 16, used to address locations within flash memory, is modified to a complemented state. When so modified, the upper and lower halves of flash memory are logically flipped. Thus, address FFFFFH maps to location EFFFFH and location F0000H maps to location E0000H. The remapped memory configuration in recovery mode is illustrated in the recovery BIOS map illustrated in FIG. 3b. In recovery mode, normal system BIOS 201 is remapped to a location 301 in the recovery BIOS map. Similarly, recovery BIOS block 202 is remapped to location 302 in the recovery BIOS map 300. Memory areas 203, 204, and 205 are also remapped to locations 303, 304 and 305 respectively.

Once the recovery mode is set using the jumper and a recovery BIOS map is achieved as illustrated in FIG. 3b, the processor of the computer system may then be power-up initialized or reset. Upon power up or reset, the processor jumps to a location within the protected recovery BIOS block 302 at a location indicated by arrow 312. In this manner, the flash device memory map may be reconfigured in a recovery mode thereby activating recovery mode processing logic residing in recovery BIOS block 302. Thus, using the mode selection means, either a normal system BIOS 201 or a recovery BIOS 302 may be activated. Once either the normal BIOS or recovery BIOS is activated, the dynamic BIOS update processing logic of the present invention may be retrieved from data storage device 106 and loaded into random access device 102 for execution by the processor 101. A mode-indicating data item is also set for the dynamic update processing logic. This mode indication specifies whether the computer system is operating in a normal or a recovery mode.

Once activated, the dynamic update processing logic of the present invention operates in a manner described in detail below and illustrated in flow charts of FIGS. 5 and 6. The dynamic BIOS update processing logic provides two sets of features depending on whether a normal mode or a recovery mode has been selected. In the normal mode, a robust human interface is provided. This interface provides graphical presentations for menu selection, file selection, help information, and status messages for updating any flash area including the system BIOS area. This graphical user interface package provides subroutines to define and display color user interface screens. This package also supports on line help to aid the user.

In a recovery mode, the recovery BIOS processing logic is designed only to bring critical portions of the system up without the advantage of configuration information. The recovery BIOS assumes that the normal system BIOS has been corrupted. Thus, the sole function of the recovery BIOS is to enable the system to a point where the normal system BIOS can be loaded into the flash memory device. The recovery BIOS performs automatically on power up without user intervention. Audible beep codes issued from a speaker of the computer system indicate the status of the programming of the BIOS area. The recovery BIOS is a subset of the normal BIOS.

When executing out of normal BIOS, the dynamic update program displays a menu of options for user selection. These options include: verification of a flash memory area, saving a selected flash memory area, updating a flash memory area, and exit. The dynamic update program then interfaces with the normal system BIOS to determine the areas in flash memory that are available for reading or writing. A submenu is then displayed indicating what areas are available for reading or writing. The user may then select the area from this menu for a verify, save, or update operation. Additional menus are displayed in order to prompt the user to enter file names for save/verify/update operations and for verifying file information before an update. Additional menus are also used to provide information to the user regarding a saved file image. The operation is then performed and the user is informed of its completion status. A normal update mode can be used to update either the normal system BIOS area 201 and 205, the user reserved area 203, or the system reserved area 204. These areas can be updated either separately or in combination. Separately programmable area 203, or other separately programmable areas, may contain LAN processing logic, SCSI processing logic, other network logic or data, video data or control logic, other hardware or software specific logic or data, or any other application specific processing logic in an area of flash memory. Areas 201 and 205 reside in the same physical block and thus are erased at the same time.

As mentioned above, the dynamic update program may be used to update any of the flash memory areas. Updating the normal system BIOS area was described above. Notable extensions of the present invention include updating the area 203, or other separately programmable areas, with LAN processing logic, SCSI processing logic, video data or control logic, other hardware or software specific logic or data, or any other application specific processing logic in an area of flash memory. If a flash memory area containing LAN processing logic, SCSI processing logic, or network logic or data is updated, a computer system may be configured for a particular network connection. In prior art networked computer systems, a network boot PROM is necessary for each specific network. It is necessary to change PROMs or add a different network circuit board in order to reconfigure a computer system for a particular network.

By using the present invention, flash memory areas other than the system BIOS area, such as area 203, may be programmed with LAN processing logic, SCSI processing logic, other network logic or data, video data or control logic, other hardware or software specific logic or data, or any other application specific processing logic in an area of flash memory. The programming of these non-system BIOS update areas is accomplished using the same dynamic update utility procedures described for use in updating the system BIOS area. In addition, the system BIOS may be configured to scan the non-system BIOS update areas on system boot up in order to determine if the code residing there should be executed in order to boot the computer system in a different manner, such as from a network. Thus, the implementation of the dynamic update of a non-system BIOS flash memory area may involve an additional step of enabling the system BIOS scanning of the non-system BIOS update areas.

This enabling step may be accomplished in several ways. First, a hardware switch in the computer system or a particular keystroke sequence may be provided to activate the scanning of the update area following programming of the area. Another alternative embodiment of the enabling step is to update the system BIOS area subsequent to an update of non-system BIOS areas. By updating the system BIOS area, a data item may be set that enables the scanning of the non-system BIOS areas. In a third alternative embodiment, the system BIOS may be configured to always scan the non-system BIOS areas and execute the code there if a particular data pattern is detected at a fixed location within the non-system BIOS area. In any of these embodiments, a non-system BIOS area of flash memory may be dynamically updated thereby eliminating the need for network specific hardware or PROM devices. Using the updated non-system BIOS area, a computer system may be booted from a network or operated in a diskless configuration.

Figure 4:
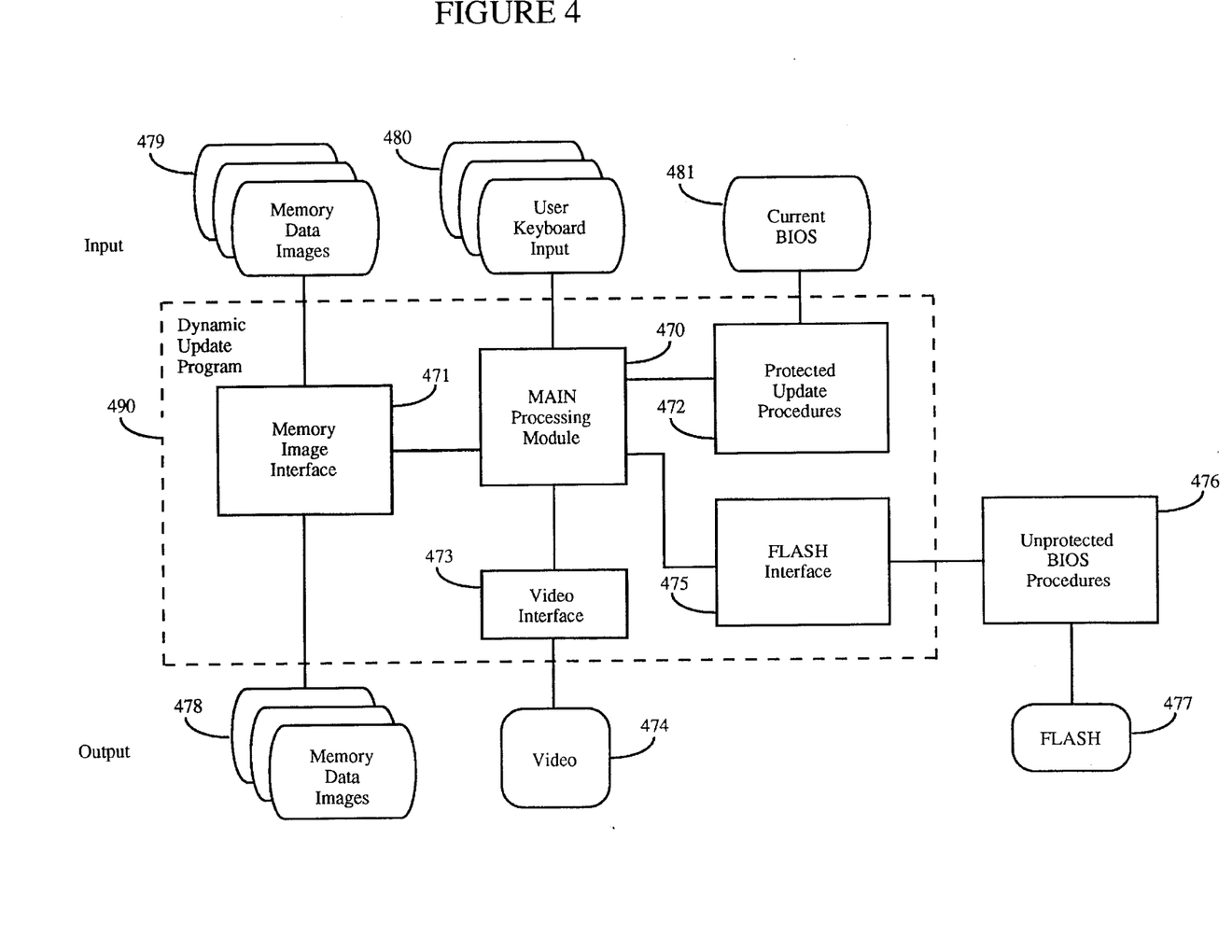
FIG. 4 is a block diagram of the processing logic architecture of dynamic BIOS update mechanism.

Referring now to FIG. 4, the architecture of the dynamic update program of the present invention is illustrated. In the preferred embodiment, there are five separate compilation modules (470, 471, 472, 473, 475) that are linked together to form the dynamic update program 490 of the present invention. The main processing module 470 assumes all control, decision making, and interfaces with the remaining four modules. The memory image interface module 471 is used to process (i.e. read and write) memory images. A memory image is the binary contents of the target non-volatile memory area. Memory images are read from an external storage medium, such as a magnetic disk device, which contains a plurality of memory image files 479. Memory images are written to files 478 in the external storage medium for permanent retention. The memory image files 479 each contain a header with various information on the memory image.

In order to update a non-volatile memory area, update logic must be used that is not residing in the non-volatile memory area being updated. If logic was used that resided in the non-volatile memory area being updated, the update operation could change or corrupt this logic. However, in order to achieve the objective of not implementing hardware specific procedures, it is advantageous to store the necessary update logic in each of the memory images 479 being updated. This update logic is stored in the memory images 479 in the form of protected software procedures. An important reason for storing the protected procedures in the memory image 479 itself is to partition hardware dependent code into the memory image 479 while maintaining hardware independent code in the dynamic update program 490, which is executed from RAM. Thus, the same dynamic update program 490 can be used for many different hardware configurations, since the update logic in each memory image 479 handles hardware specific concerns. When a user requests an update operation, the dynamic update program 490 requests the normal system BIOS 481 to copy these procedures to a safe random access memory position specified by the dynamic update program 490. This operation ensures that memory image itself defines and maintains these protected procedures and that they do not reside in the updated address space during flash updates. The protected update procedures module 472 is responsible for obtaining these protected procedures from the update memory image 479 and making them available to the main processing module 470 of the dynamic update program 490.

The video interface module 473 performs all required interaction with the video display device 474. This interaction includes displaying menus, displaying defined error messages, displaying status messages, and obtaining required information on memory image locations (i.e. file names). A user keyboard input means 480 is also provided for receiving user input and command selections. The flash interface module 475 provides a bridge between a set of unprotected BIOS procedures 476 and the main processing module 470. Unprotected BIOS procedures 476 such as "Read Flash Memory" do not require the use of the protected procedures defined earlier. These unprotected BIOS procedures 476 are accessed through a processor interrupt (INT 15) thereby providing access to the flash memory device 477. The interface specifications for both the protected and unprotected procedures are provided below just before the Claims.

OPERATION OF THE PREFERRED EMBODIMENT

The processing logic of the dynamic update program of the preferred embodiment is operably disposed within random access memory 102 and executed by processor 101 of the computer system described above. The processing logic of the present invention may equivalently be disposed in other memory means accessible to processor 101 for execution. The processing logic of the dynamic update program 490 can be a separately compiled and loaded entity or incorporated as part of a larger software system. In either case, a means for activating the processing logic of the present invention may be performed using the techniques described above. Once activated, the processing logic of the present invention operates in the manner described below and illustrated in the flow charts of FIGS. 5 and 6.

Figure 5:
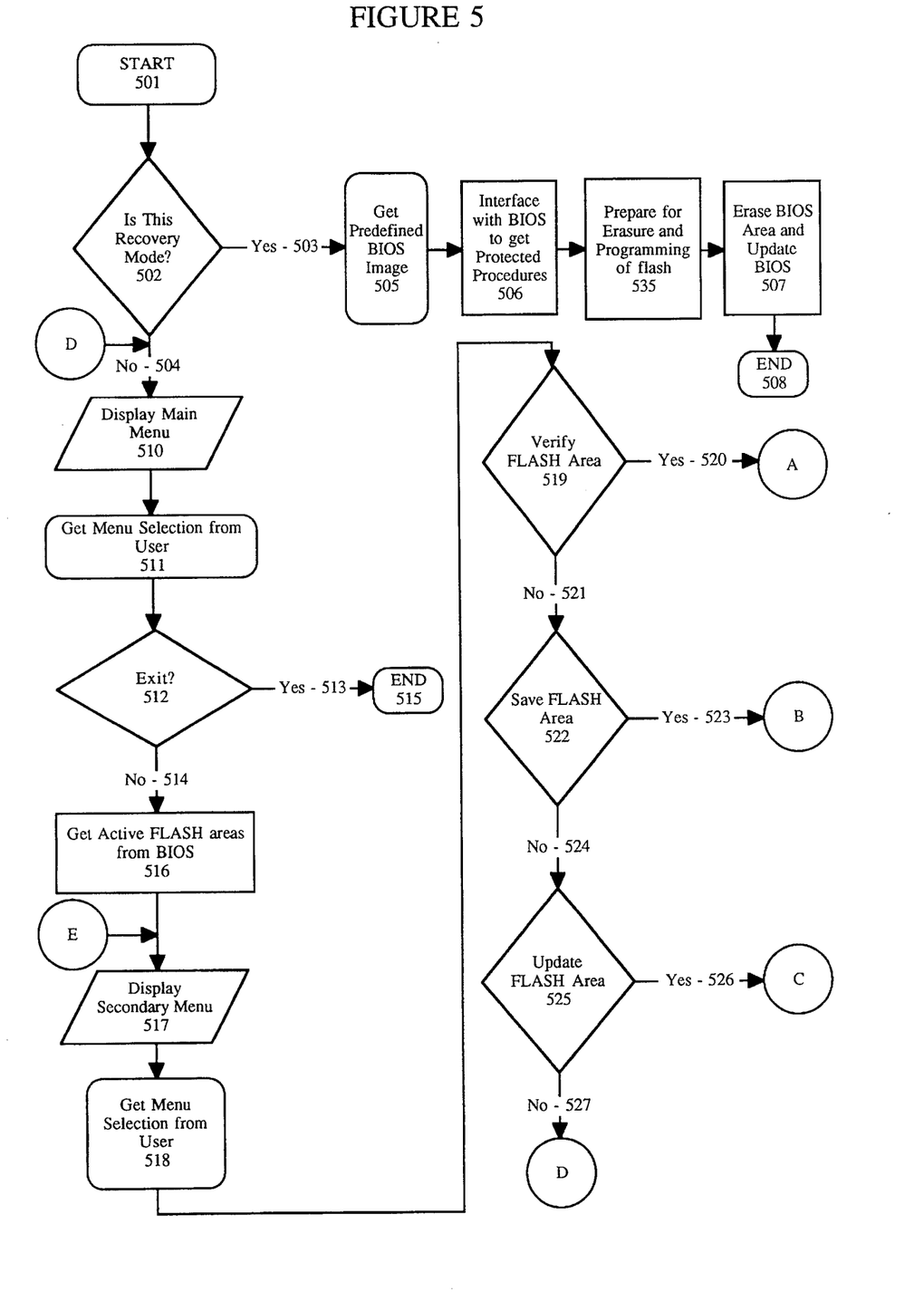
FIGS. 5 and 6 are flow charts of the dynamic BIOS update processing logic of the present invention.

Referring now to FIG. 5, the dynamic update program of the present invention starts at block 501 on activation. At decision block 502, a test is performed to determine if the normal mode or recovery mode has been selected. As described earlier, the normal BIOS and the recovery BIOS both set a mode indicating data item when either BIOS is activated. By accessing this data item in decision block 502, the active mode can be determined. If the recovery mode is selected, processing path 503 is taken to processing block 505 where a predefined normal system BIOS image is retrieved from the data storage device. Next, the recovery BIOS is accessed to retrieve the protected BIOS update procedures (processing block 506). The protected procedures retrieved in block 506 include an erase BIOS procedure and a program BIOS procedure. Next, the computer system is prepared for the erasure and programming of flash memory (processing block 535). Preparing the computer system for erasure and programming of flash memory involves operations including disabling cache and shadowing functions, enabling write operations to flash, and other hardware specific operations. Once the protected procedures are retrieved and the computer system is prepared, the erase BIOS procedure is activated to erase the normal system BIOS area in flash memory. Once the erase operation is complete, the program BIOS procedure is used to load the predefined BIOS image into the normal system BIOS area of flash memory (programming block 507). Once this operation is complete, the processing logic of the dynamic update program terminates at processing block 508. The user is notified of completion by an audible beep code issued from a speaker of the computer system. At the termination of the recovery mode processing, the jumper or mode selection means can be switched back to a normal mode selection and the computer system can be restarted or power up initialized in order to transfer control to the newly loaded normal system BIOS in flash memory.

Referring again to decision block 502, if a normal mode has been selected, processing path 504 is taken to processing block 510 where a main menu of normal update options are displayed to the user. These options include a verify flash area operation, a save flash area operation, an update flash area operation, and an exit operation. Once a menu has been presented to the user, a menu selection is retrieved from input device 104 in processing block 511. If the exit operation is selected in decision block 512, processing path 513 is taken to termination block 515 where execution of dynamic update program terminates.

If, however, the exit operation is not selected, processing path 514 is taken to processing block 516 where an unprotected normal system BIOS procedure is activated to retrieve active flash areas in BIOS that may be verified, saved, or updated. The active flash areas are displayed in a secondary menu in processing block 517. The user is again prompted to enter a menu selection through input device 104 in processing block 518. If a verify flash area is selected, processing path 520 is taken to the bubble labeled A illustrated in FIG. 6. If a save flash area operation is selected, processing path 523 is taken to the bubble labeled B in FIG. 6. Similarly, if an update flash area operation is selected, processing path 526 is taken to the bubble labeled C in FIG. 6. If an inappropriate (i.e. Return to Main Menu) command selection is made, processing path 527 is taken to the bubble labeled D where control returns to processing block 510 where the main display menu is again presented to the user.

Figure 6:
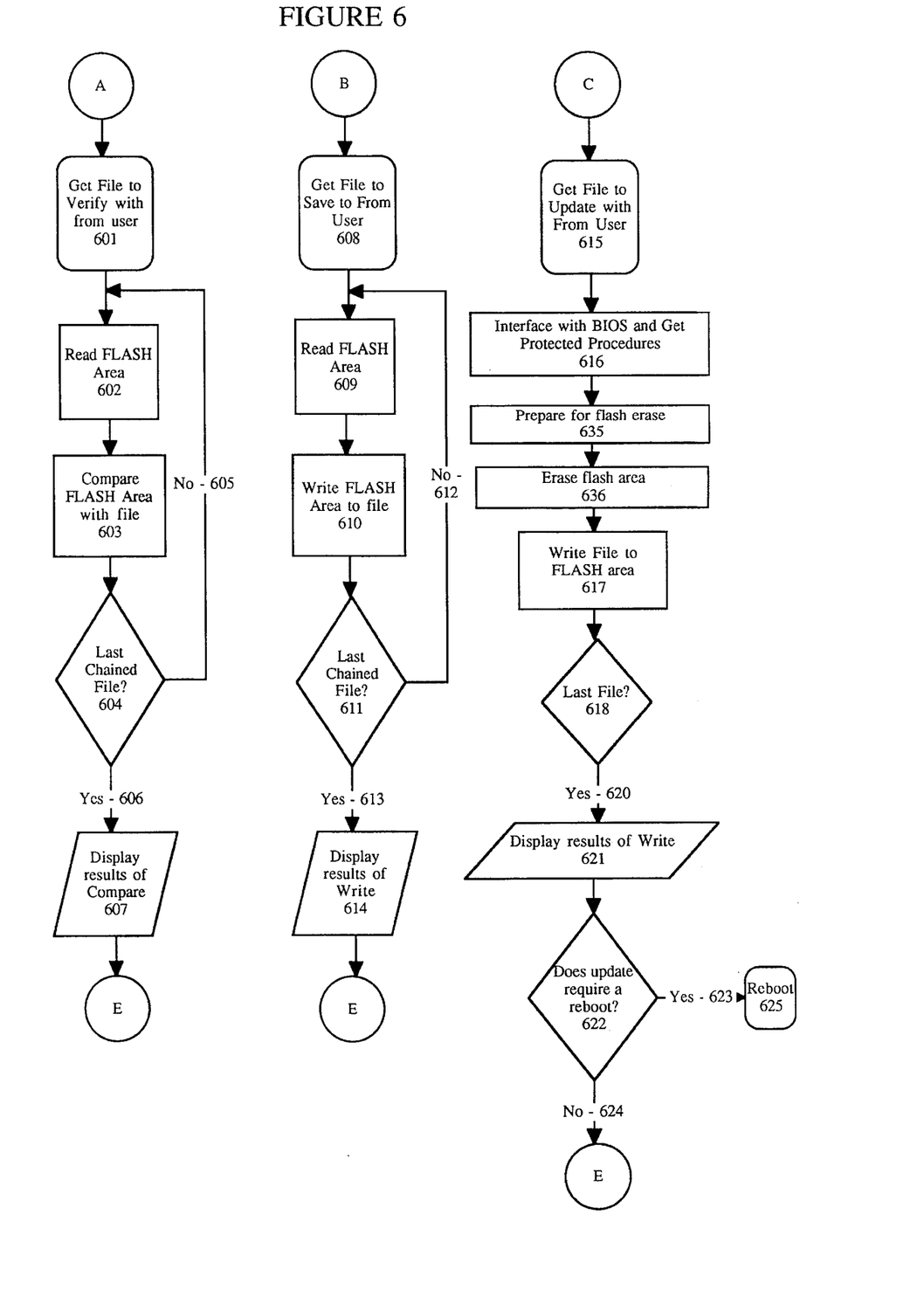

Referring now to FIG. 6, the processing logic for each of the three flash memory area operations is depicted. If a verify flash memory operation is selected, the processing logic below the bubble labeled A is executed. In processing block 601, the user is prompted to enter the name of a file that will be compared against the specified flash memory area. If a single file is not large enough to contain the entire contents of the specified flash memory area, several files containing portions of the comparison flash data image contents may be chained together using a file chaining technique well known in the art. In the loop between processing block 602 and decision block 604, the contents of the comparison file or chained files are read and compared with the contents of the specified flash memory area. If differences are found, the loop terminates with a verify error. The verification process continues until the entire contents of the comparison file and associated chained files are compared with the contents of the selected flash memory area. When verification is complete, processing path 606 is taken to processing block 607 where the comparison results are displayed to the user. Processing then continues at the bubble labeled E illustrated in FIG. 5 where the operator is prompted for the next command selection.

Referring again to FIG. 6, the processing logic associated with the save flash memory area command is illustrated below the bubble labeled B. When the user selects a save flash memory area command, processing control is transferred to processing block 608 where the user is prompted for the entry of a file name which will be used to store the selected flash memory area. Multiple files may be chained together using well known techniques if a single file is not large enough to store the entire selected flash image area. A loop is then initiated between processing block 609 and decision block 611 where the contents of the selected flash memory area is read (processing block 609) and then written to the specified file or chained files (processing block 610). The saving operation continues until the entire contents of the selected flash memory area have been transferred to the specified file or files. When this occurs, processing path 613 is taken to processing block 614 where the status of the save operation is displayed to the user. Processing then continues at the bubble labeled E illustrated in FIG. 5 where the operator is prompted for the entry of the next command selection.

Referring again to FIG. 6, the processing logic for the update flash area command is illustrated below the bubble labeled C in FIG. 6. When the update flash area command is selected by the user, processing control is transferred to processing block 615 where the user is prompted for the entry of a file name that contains a flash data image that will be transferred into the specified flash memory area. In order for the update utility of the present invention to handle various computer configurations and flash memory devices, the update processing logic is embedded in the normal system BIOS as protected procedures. The computer system is prepared for the erasure and programming of flash memory (processing block 635). The flash memory area is erased in processing block 636. These protected procedures are retrieved from the BIOS in processing block 616 for use by the dynamic update utility of the present invention. These protected update procedures are used by the dynamic update utility to transfer the contents of the specified file or files into the specified flash memory area (processing block 617). This update operation continues until the entire contents of the specified file have been transferred to the specified flash memory area. When the update is complete (processing path 620), the status results of the update operations are displayed to the user in processing block 621. If the update requires a computer system reboot (processing path 623), the newly updated BIOS may be activated by rebooting the computer system in processing block 625. If no reboot is necessary, processing path 624 is taken to the bubble labeled E illustrated in FIG. 5 where the user is prompted for the entry of a new command selection.

Thus, a computer system wherein a portion of code/data stored in a non-volatile device that can be dynamically modified or updated without removing covers or parts from the computer system is described.

Although the present invention has been described herein with reference to a specific embodiment, many modifications and variations therein will readily occur to those skilled in the art. Accordingly, all such variations and modifications are included within the intended scope of the present invention as defined by the following claims.

| BIOS FLASH MEMORY PROCEDURES |
|---|

A. Unprotected BIOS Procedures
The following BIOS Service Calls are for the FLASH Memory Interface.
INTERRUPT = 15H
    FUNCTION (AH) = 0DBH
SUBFUNCTIONS (AL)
```
00H  Read FLASH Memory Area
     Input:     DS =   Segment of output file header
                SI =   Offset of output file header
                ES =   Segment of buffer to place read info
                DI =   Offset of buffer to place read info
     Output:    AH =   Status out   0 = Successful Read
                                    1 = Invalid Input
01H  Report FLASH Memory Areas
     Input      CL =   Logical Area Number (0 – 0FFh)
     Output     DI =   offset of pointer to 32 byte area-info
                       structure
                ES =   segment of pointer to 32 byte area-info
                       structure
                AH =   Status out   0 = Successful
                                    1 = Invalid Input
02H  Get Protected Procedure Size
     Input:     none
     Output:    BX =   Size of protected procedures in bytes
03H  Prepare for FLASH Erasure
     Input:     ES =   Segment of buffer to place protected
                       procedures
                DI =   Offset of buffer to place protected
                       procedures
                DS =   Segment of header of input file
                SI =   Offset of header of input file
                BX =   Segment of buffer for BIOS tables
                DX =   Offset of buffer for BIOS tables
     Output     BX =   Amount of extra memory required by
                       BIOS to complem operation
                AH =   Status out   0 = Successful
                                        completion
                                    1 = Invalid Input
                                    2 = Invalid operation
                                    3 = Invalid size
                                    4 = Invalid data type
04H  Is Recovery Mode Active
     Input:     none
     Output:    BX     0 = Recovery mode active
                       non-zero = Normal mode active
                AH =   Status out   0 = Successful
                                        completion
                                    1 = FLASH memory
                                        is not supported
                                        on this system
```

| B. Protected BIOS Procedures |
|---|

The protected procedures are accessed by a far call to the address returned in ES:DI by the "Prepare for Erasure" interrupt call and require the following interface:
```
AL =  00H   Erase FLASH Memory Area
      Input:     DS =   Segment of input file header
                 SI =   Offset of input file header
                 ES =   Segment of additional memory requested
                        by BIOS
                 DI =   Offset of additional memory requested by
                        BIOS
                 CH =   State     0 = Normal Mode
                                  1 = Recovery Mode
                 BX =   Segment of buffer for BIOS tables
                 DX =   Offset of buffer for BIOS tables
      Output:    AH =   Status out   0 = Successful Read
                                     1 = Invalid Input
                                     2 = Erase failure
AL =  01H   Program FLASH Memory Area
      Input:     CH =   State     0 = Normal Mode
                                  1 = Recovery Mode
                 DS =   Segment of input file header.
                 SI =   Offset of input file header
                 ES =   Segment of additional memory requested
```

| B. Protected BIOS Procedures |
|---|

```
                        by BIOS
                 DI =   Offset of additional memory requested by
                        BIOS
                 BX =   Segment of buffer for BIOS tables
                 DX =   Offset of buffer for BIOS tables
      Output:    AH =   Status out   0 = Successful Read
                                     1 = Invalid Input
                                     3 = Area not erased
                                     4 = Verify Error
```

We claim:

1. A computer system comprising:

a processor for executing processing logic;

a programmable non-volatile semiconductor memory device coupled to said processor, said programmable non-volatile semiconductor memory device having BIOS firmware programmed therein, portions of said programmable non-volatile semiconductor memory device being write modifiable;

a random access memory (RAM) device coupled to said processor;

means for transferring a first portion of said BIOS firmware from said programmable non-volatile semiconductor memory device to said RAM, said first portion being specifically directed to updating other portions of said programmable non-volatile semiconductor memory device, said means for transferring coupled to said processor;

means for erasing a portion of said programmable non-volatile semiconductor memory device, said means for erasing coupled to said processor; and, means for updating a second portion of said BIOS firmware in said programmable non-volatile semiconductor memory while said first portion of said BIOS firmware is executing from said RAM, said means for updating coupled to said processor.

2. The computer system as claimed in claim 1 wherein said programmable non-volatile semiconductor memory device is a flash semiconductor memory device.

3. The computer system as claimed in claim 1 wherein said programmable non-volatile semiconductor memory device is partitioned into at least two separately erasable and programmable partitions, a first partition storing recovery processing logic and data, a second partition storing normal operating system processing logic and data.

4. The computer system as claimed in claim 1 wherein said firmware is a basic input/output system (BIOS).

5. The computer system as claimed in claim 1 said means for updating further including:

means for selecting an update type, said update type being either a normal update type or a recovery update type, said means for selecting coupled to said processor.

6. The computer system as claimed in claim 3, wherein said means for updating further including:

means for selecting an update type, said update type being either a normal update type or a recovery update type, said means for selecting coupled to said processor;

normal update processing logic operably disposed in said random access memory;

means for activating said normal update processing logic if said normal update type is selected by said means for selecting; and means for reprogramming said second partition if said normal update processing logic is activated.

7. The computer system as claimed in claim 6 said means for reprogramming further including:

protected update processing logic residing within said normal operating system processing logic stored in said second partition;

means for transferring said protected update processing logic to said random access memory; and means for activating said protected update processing logic, said protected update processing logic controlling the programming of said second partition.

8. The computer system as claimed in claim 3 said means for updating further including:

means for selecting an update type, said update type being either a normal update type or a recovery update type, said means for selecting coupled to said processor;

means for activating said recovery processing logic if said recovery update type is selected by said means for selecting an update type; and means for reprogramming said second partition if said recovery processing logic is activated.

9. The computer system as claimed in claim 3 wherein said first partition is electronically protected from erasure or modification.

10. A computer system comprising:

a processor for executing processing logic;

a programmable non-volatile semiconductor memory device coupled to said processor, said programmable non-volatile semiconductor memory device having BIOS firmware programmed therein, portions of said programmable non-volatile semiconductor memory device being write modifiable;

a random access memory (RAM) device coupled to said processor;

means for transferring a first portion of said BIOS firmware from said programmable non-volatile semiconductor memory device to said RAM, said first portion being specifically directed to updating other portions of said programmable non-volatile semiconductor memory device, said means for transferring coupled to said processor;

means for erasing a portion of said programmable non-volatile semiconductor memory device, said means for erasing coupled to said processor; and, means for updating application specific BIOS firmware residing in a second portion of said programmable non-volatile semiconductor memory device while said first portion of said BIOS firmware is executing from said RAM, said means for updating coupled to said processor.

11. The computer system as claimed in claim 10 further including means for enabling scanning of said second portion of said programmable non-volatile semiconductor memory device containing application specific firmware.

12. The computer system as claimed in claim 10 wherein said application specific firmware includes LAN processing logic.

13. The computer system as claimed in claim 10 wherein said application specific firmware includes SCSI processing logic.

14. In a computer system having a processor for executing processing logic, a random access memory (RAM) coupled to said processor and a programmable non-volatile semiconductor memory device coupled to said processor, said programmable non-volatile semiconductor memory device having firmware programmed therein, portions of said programmable non-volatile semiconductor memory device being write modifiable, said firmware including a first portion programmed into an electronically write protected area of said programmable non-volatile semiconductor memory device, said first portion being specifically directed to updating said programmable non-volatile semiconductor memory device, a process for updating portions of said programmable non-volatile semiconductor memory device while said firmware is executing from said RAM, said process comprising the steps of:

transferring said first portion from said electronically protected area of said programmable non-volatile semiconductor memory device to said RAM;

executing said first portion to update a second portion of said programmable non-volatile semiconductor memory device; and updating said second portion while said first portion is executing from said RAM.

15. The process as claimed in claim 14, said process further including the steps of:

selecting whether said first portion or said second portion is initially executed;

transferring said second portion from an unprotected area of said programmable non-volatile semiconductor memory device to said RAM, said step of transferring said second portion being performed if said second portion is selected for initial execution in said selecting step;

executing said second portion from said RAM if said second portion is selected for initial execution in said selecting step; and executing said first portion from said RAM if said first portion is selected for initial execution in said selecting step.

16. The process of claim 15, wherein said second portion of said programmable non-volatile semiconductor memory device includes a second version of operating system firmware.

17. The process of claim 15, wherein said second portion of said programmable non-volatile semiconductor memory device includes application specific processing logic.

18. In a computer system having a processor for executing processing logic, a random access memory (RAM) coupled to said processor and a programmable non-volatile semiconductor memory device coupled to said processor, said programmable non-volatile semiconductor memory device having operating system firmware programmed therein, portions of said programmable non-volatile semiconductor memory device being write modifiable, a process for updating application specific firmware residing in a portion of said programmable non-volatile semiconductor memory device while said operating system firmware is executing, said process comprising the steps of:

transferring a first portion of said operating system firmware from said programmable non-volatile semiconductor memory device to said RAM, said first portion being specifically directed to reprogramming portions of said programmable non-volatile semiconductor memory device; and executing said first portion of said operating system firmware to reprogram a second portion of said programmable non-volatile semiconductor memory device with application specific firmware.

19. The process as claimed in claim 18 further including a step of enabling scanning of said second portion of said programmable non-volatile semiconductor memory device containing application specific firmware.

20. The process as claimed in claim 18 wherein said application specific firmware includes LAN processing logic.

21. The process as claimed in claim 18 wherein said application specific firmware includes SCSI processing logic.

22. A computer system comprising:

a processor for executing logic instructions;

a programmable flash memory electrically connected to said processor, said programmable flash memory subdivided into a first part and a second part;

said first part of said programmable flash memory stores BIOS instructions for a normal update mode, wherein said normal update mode includes the instructions needed to save, verify, or update areas of flash memory including said second part of said programmable flash memory;

said second part of said programmable flash memory stores BIOS instructions for a recovery update mode, wherein said recovery update mode includes instructions needed to start the computer system and update the first part of said programmable flash memory.

23. The computer system described in claim 22, wherein said computer system includes a hardware device for selecting either said normal update mode or said recovery update mode.

24. The computer system of claim 23 wherein said hardware device is a jumper cable.

25. A method of updating a BIOS stored in a programmable non-volatile semiconductor memory device in a computer, said method comprising the steps of:

creating two portions of BIOS, a normal update portion and a recovery update portion and storing each portion in a section of said programmable non-volatile semiconductor memory device;

using a hardware device to switch between two start-up modes in said computer;

choosing to load into RAM memory either said normal update portion of BIOS or said recovery update portion of BIOS depending on setting of said hardware device;

loading the chosen portion of BIOS into said RAM memory; and updating the portion of BIOS not loaded into said RAM memory.

* * * * *

UNITED STATES PATENT AND TRADEMARK OFFICE
CERTIFICATE OF CORRECTION

PATENT NO. : 5,579,522
DATED : November 26, 1996
INVENTOR(S) : Christeson et al.

It is certified that error appears in the above-identified patent and that said Letters Patent is hereby corrected as shown below:

In column 13 at line 32 delete "complem" and insert --complete--

Signed and Sealed this

Twenty-second Day of July, 1997

Attest:

BRUCE LEHMAN

*Attesting Officer*  *Commissioner of Patents and Trademarks*